(No Model.)
C. R. WELLS.
DEVICE FOR TEACHING PENMANSHIP.
No. 510,372. Patented Dec. 5, 1893.
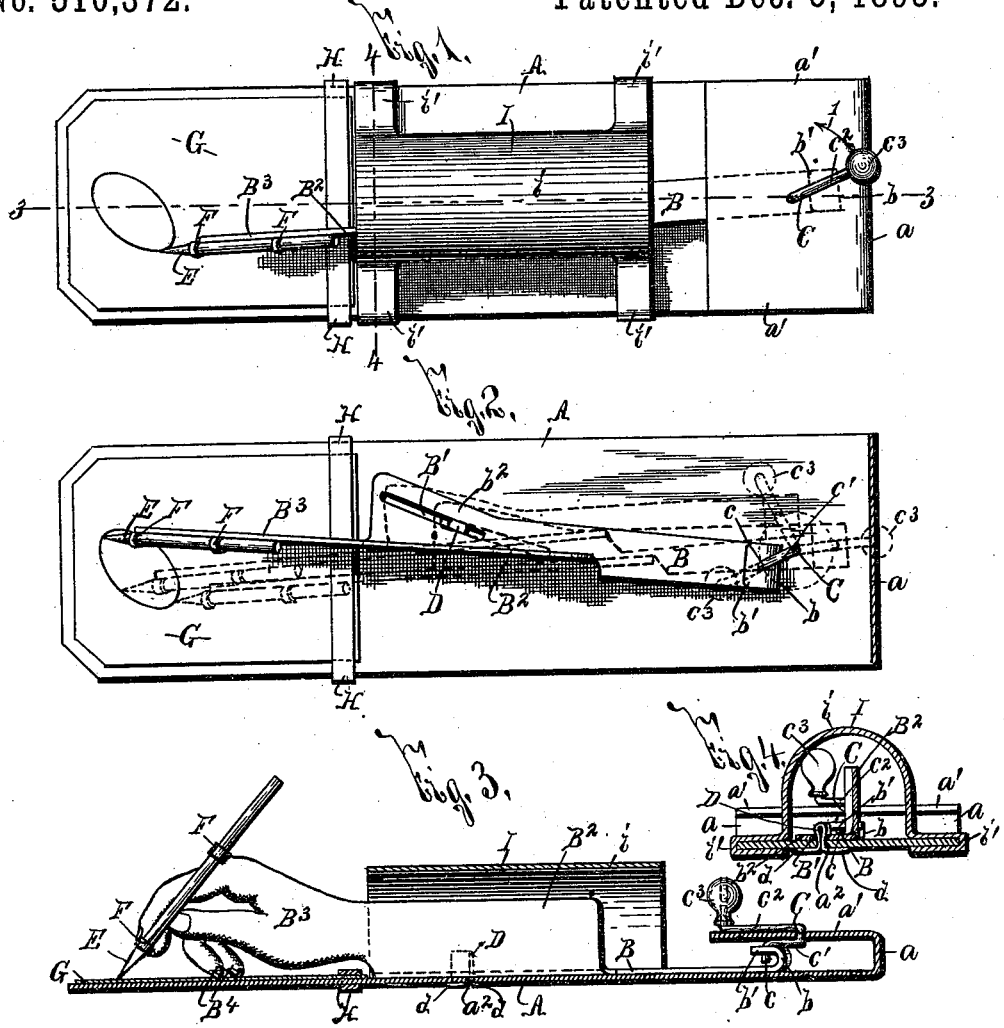
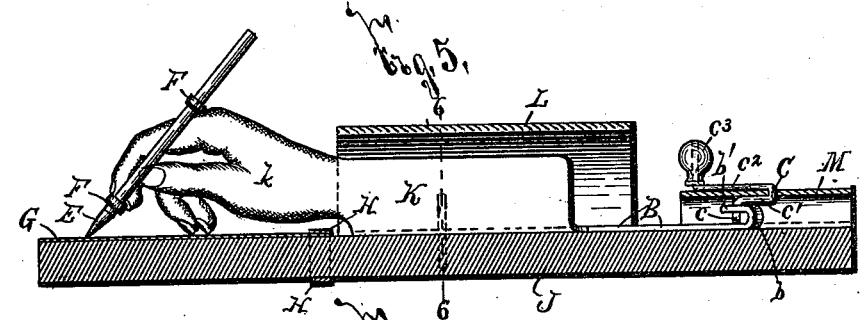
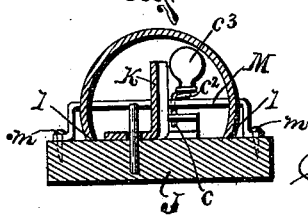
WITNESSES:
INVENTOR
Charles R. Wells
BY
ATTORNEYS
THE NATIONAL LITHOGRAPHING COMPANY,
WASHINGTON, D. C.

UNITED STATES PATENT OFFICE.

CHARLES R. WELLS, OF SYRACUSE, NEW YORK, ASSIGNOR OF TWO-THIRDS TO CHARLES W. BARDEEN, OF SAME PLACE.

DEVICE FOR TEACHING PENMANSHIP.

SPECIFICATION forming part of Letters Patent No. 510,372, dated December 5, 1893.

Application filed May 27, 1892. Serial No. 434,583. (No model.)

*To all whom it may concern:*

Be it known that I, CHARLES R. WELLS, of Syracuse, in the county of Onondaga, in the State of New York, have invented new and useful Improvements in Devices for Teaching Penmanship, of which the following, taken in connection with the accompanying drawings, is a full, clear, and exact description.

My invention relates to improvements in mechanical means for teaching penmanship, and has for its object the production of a simple and effective device of economical construction and formed with a movable arm having a depending indicating finger movable in an elliptic plane; and to this end it consists, essentially, in a base plate, a movable arm pivoted at one extremity to the base plate and formed with an inclined guide way arranged between its ends and with an indicating finger at its free end, a projection on the base plate adapted to register with the inclined guide way for causing the depending finger to move in an inclined plane, a top shell for covering a portion of the arm, and in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is a top plan view of one form of my invention. Fig. 2 is a similar top plan view to Fig. 1, the top plate and a portion of the base plate being removed for the purpose of clearly illustrating the movable arm. Fig. 3 is a longitudinal vertical sectional view, taken on line —3—3—, Fig. 1. Fig. 4 is a transverse sectional view, taken on line —4—4—, Fig. 1. Fig. 5 is an elevation of a somewhat modified form of my invention, and Fig. 6 is a transverse vertical sectional view, taken on line —6—6—, Fig. 5.

In the practical teaching of penmanship I have experienced more or less difficulty in clearly illustrating to students the actual movement of the arm during the formation of certain fundamental figures and particularly of the inclined ellipse. This ellipse is formed in correct practice by holding the wrist and fingers rigid, and by rolling or rotating the rear end of the fore arm upon the muscles at that locality and there is more or less tendency for a beginner, or one unfamiliar with the proper method of making the ellipse to make the same either when the entire fore arm is elevated above the support for the paper or book, or by a movement of the wrist and fingers.

My present invention consists of a practical device for clearly illustrating the operation of the arm in making an inclined ellipse, and is of simple and economical construction.

The base plate —A— of my invention may be of desirable form, size, and construction. At Figs. 1, 2, and 3 I have shown the same as composed of sheet metal or tin having its rear extremity bent upwardly at —a— and forwardly at —a'—.

—B— is the movable arm, which is also of desirable form, size, and construction. At Figs. 1, 2, and 3 this arm is shown as composed of sheet metal, as tin, and is arranged with its rear end beneath the top fold —a'— of the base plate. The rear end of the arm —B— is bent upwardly at —b— and forwardly at —b'—, and is engaged with a downturned end —c— of a crank arm —c'— formed upon a spindle —C— journaled in the top portion —a'— of the base plate. The spindle —C— is formed with the upper crank arm —$c^2$— and with a hand engaging portion —$c^3$—.

—B'— represents an inclined guide way formed or provided in the arm —B— midway between its extremities, and, as here illustrated, this guide way consists of an inclined slot in a laterally extending arm —$C^2$—.

—D— is a projection on the base plate engaged with the guide way or slot —B'—, and, as preferably constructed, this projection consists of a folded strip of tin inserted through an opening —$a^2$— in the base plate, and having its opposite extremities —d—d— bent outward beneath the lower face of said base plate.

At Figs. 1, 2, and 3 I have shown the arm —B— as formed with an upturned rib —$B^2$— having its forward end —$B^3$—constructed to somewhat indicate the form of a hand in side elevation.

—E— is a marker at the forward extremity of the arm —B— for indicating the plane of its movement, and it will be evident that this marker may be of any desirable form, size, and construction. As here illustrated the marker consists of a pencil of small diameter removably engaged with clamps —F—F— supported one above the other upon the forward end —B³— of the movable arm —B—. The clamps —F— are also of any desirable form, size, and construction, and consist preferably of spring arms formed integral with the rib —B— and —B²— and formed by cutting out a portion thereof and bending the same outwardly into a hook shape. These clamps —F—F— are so arranged that, when engaged thereby, the pencil is held at the proper altitude, and I preferably form the end —B³— of the rib —B²— with a rearwardly extending projection —B⁴— having its end bifurcated for indicating the two outer fingers of the hand in correct position for writing.

Directly beneath the marker —E— I provide an impression plate —G— consisting of one or more sheets of paper removably held in position by a suitable clamp —H—, here shown as a rubber band encircling the rear end of said impression plate and the forward end of the base plate —B—. It will thus be evident that, as the spindle —C— is revolved by the crank arm —c²— in the direction indicated by arrow —1— the crank arm —c'— revolves the rear end of the arm —B— and the inclined guide way or slot —B'—, and the projection —D— registered therewith causes the finger —E— to produce an inclined ellipse upon the impression plate —G—, and thus indicates the movement of the free end of the movable arm and correctly illustrates to the student the operation or movement of his arm required to correctly produce an inclined ellipse. It is evident, however, that the impression plate —G— may be dispensed with, and that the marker —E—, by the movement of the movable arm —B— is moved in an inclined elliptical path, and correctly represents the movement of the writing pen, but does not make an elliptical mark, as its lower end does not touch the base-plate, but moves in an elliptical plane above the same when the impression plate —G— is removed. Indeed the sole object of the marker is to indicate the movement of the pen or pencil held by a writer, and this it does equally well whether its lower end moves in the proper path, or whether its lower end traces its path of movement upon an impression plate.

—I— is a top shell for covering a portion of the arm —B—, and, as here shown, this shell is composed of a thin plate having the central semi-barrel shaped portion —i— and laterally extending arms —i'— arranged at the ends of the central portion and having their extreme ends bent or looped beneath the base plate as shown at Fig. 4.

The base plate, movable arm, and top shell have been described and are here illustrated at Figs. 1, 2, and 3 as composed of tin or other suitable sheet metal, as the same is quickly stamped to the required size and form and assembled with great economy in manufacture. It will be evident, however, that these parts may be suitably formed and constructed to more clearly illustrate the human arm, as, for instance, the top shell may be formed to represent a sleeve and the end of the movable arm —D— suitably rounded and painted or ornamented to closely represent a hand. It will also be evident that, if desired, the construction of my invention, just described, may be somewhat simplified by forming the indicating finger integral with the forward end —B³— of the arm and dispensing with the impression plate and clamp —H—, but I do not consider this as practical a construction, since after the formation of the inclined ellipse upon the impression plate the student may then remove the same and place it in front of his pen to secure the required inclination, and may, at the same time, endeavor to move his arm in the same manner and with the same motion as the arm —D— of my teaching device.

At Figs. 5 and 6 I have shown a somewhat modified form of my invention, in which the base plate —j— is formed of wood or similar material, the forward end —k— of the arm —K— rounded to represent a hand, and the top shell —L— formed of paste-board or other similar material suitably secured at its longitudinal edges —l— to the base plate. In this construction of my invention the rear end of the base plate is provided with a folded strip —M— of tin or other suitable material secured to the top face thereof by clamps —m—.

My invention is particularly applicable for self instruction and for enabling teachers and instructors to illustrate to their scholars the correct position of the hand and movement of the arm in writing, since it may be referred to constantly or whenever it is desired to refresh the memory.

The operation of my invention will be readily perceived from the foregoing description and upon reference to the drawings, and it is evident that its construction is practical and economical, and that it greatly facilitates the teaching of the movement of the arm in forming an inclined ellipse in the manner described.

As considerable change may be made in the relative construction and arrangement of the parts of my teaching device without departing from the spirit of my invention I do not herein limit myself to such precise detail construction and arrangement.

Having thus fully described my invention, what I claim as new, and desire to secure by Letters Patent, is—

1. A device for teaching penmanship, the same comprising a base plate, a movable crank arm supported by the base plate, a movable arm pivoted at one extremity to the crank arm and formed with an inclined guide way or slot arranged between its ends, and provided with a marker at its free extremity and a projection on the base plate adapted to register with the guide way or slot for causing the opposite or free extremity of the movable arm to move in an elliptical plane, substantially as and for the purpose set forth.

2. A device for teaching penmanship, the same comprising a base plate, a movable crank arm supported by the base plate, a movable arm pivoted at one extremity to the crank arm and formed with an inclined guide way or slot arranged between its ends, and provided with a marker at its free extremity, a projection on the base plate adapted to register with the guide way or slot for causing the opposite or free extremity of the movable arm to move in an elliptical plane, and a top plate for covering a portion of said arm, substantially as and for the purpose specified.

3. A device for teaching penmanship, the same comprising a base plate, a movable crank arm supported by the base plate, a movable arm consisting of a substantially horizontal rib and an upright rib, said horizontal rib being pivoted at one end to the crank arm and provided at the other end with an inclined guide way or slot and said upright rib extending beyond the guide way or slot and being provided with a marker at its free extremity, and a projection on the base plate adapted to register with the opposite or free extremity of the movable arm for moving the marker of said arm in an elliptical plane, substantially as specified.

4. In a device for teaching penmanship, the combination of a base having one end folded upon itself, a crank arm journaled in the folded end of the base plate, a movable arm having one extremity folded upon itself and mounted beneath the folded portion of the base plate and engaged with the crank arm, said movable arm being formed with an inclined guide way or slot between its extremities, and being provided with a marker at its free extremity and a projection on the base plate adapted to register with the guide way or slot for causing the opposite or free extremity of the arm to move in an elliptical plane, substantially as for the purpose set forth.

In testimony whereof I have hereunto signed my name, in the presence of two attesting witnesses, at Syracuse, in the county of Onondaga, in the State of New York, this 10th day of May, 1892.

CHARLES R. WELLS.

Witnesses:
CLARK H. NORTON,
E. A. WEISBURG.